(12) United States Patent
LaFerriere (10) Patent No.: US 11,735,872 B2
(45) Date of Patent: Aug. 22, 2023

(54) SCREW ASSEMBLY FOR SECURING CONNECTORS

(71) Applicant: Schweitzer Engineering Laboratories, Inc., Pullman, WA (US)

(72) Inventor: Brian D. LaFerriere, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 445 days.

(21) Appl. No.: 17/068,106

(22) Filed: Oct. 12, 2020

(65) Prior Publication Data

US 2022/0115826 A1    Apr. 14, 2022

(51) Int. Cl.
*H01R 13/74* (2006.01)
*H01R 43/00* (2006.01)
*F16B 5/02* (2006.01)

(52) U.S. Cl.
CPC ............ *H01R 13/748* (2013.01); *F16B 5/02* (2013.01); *H01R 43/00* (2013.01)

(58) Field of Classification Search
CPC ..... H01R 43/00; H01R 43/26; H01R 2201/06
See application file for complete search history.

(56) References Cited

U.S. PATENT DOCUMENTS

| 5,066,246 A * | 11/1991 | Jensik ............... H01R 13/6215 29/842 |
| 8,241,059 B2 * | 8/2012 | Huang ............... H01R 12/7047 439/573 |
| 2010/0173520 A1 * | 7/2010 | Weidner ............ H01R 13/743 439/564 |

OTHER PUBLICATIONS

Keystone Electronics Corp, Jack Screw & Harware Part No. 7231, May 9, 2005. retrieved from https://www.keyelco.com/product.cfm/product_id/448 on Oct. 14, 2020.
Keystone Electronics Corp, Jack Screws flyer, Oct. 2019. retrieved from https://www.keyelco.com/category.cfm/Screws/Jack-Screws/p/483/id/485 on Oct. 14, 2020.
TE Connectivity, TTI Part No. 201047-2 datasheet, Jul. 14, 1995, retrieved from https://www.tti.com/content/ttiinc/en/apps/part-detail.html?mfrShortname=TYC&partsNumber=201047-2&autoRedirect=true&minQty=1 on Oct. 14, 2020.

\* cited by examiner

*Primary Examiner* — Jason L Vaughan
*Assistant Examiner* — Amanda Kreiling
(74) *Attorney, Agent, or Firm* — Fletcher Yoder, P.C.

(57) ABSTRACT

A system includes a jack screw including a body portion and a keyed portion extending along a length of the body portion. The system includes a panel including a first aperture configured to receive the jack screw. The system includes a connector including a second aperture configured to receive the jack screw. The system includes a plate including a third aperture configured to receive the jack screw, where the jack screw is configured to be aligned along an axis through the first aperture, the second aperture, and the third plate aperture, where a portion of the body portion of the jack screw extends past a locking plate.

17 Claims, 6 Drawing Sheets

SCREW ASSEMBLY FOR SECURING CONNECTORS

BACKGROUND

This disclosure relates to systems and methods for attaching and detaching electrical connectors or ports to a panel and/or an accessory. More specifically, the present disclosure is related to screw assemblies for securing electrical connectors or ports to a panel and/or assembly.

An electrical port may be secured to a panel in certain equipment to protect circuit or electrical components from environmental factors (e.g., high voltage, moisture) or may provide mechanical support. The electrical port may be secured to the panel using various types of fasteners (e.g., screws). However, certain fasteners may be loosened or may become less secure when components (e.g., cables) are continuously connected and disconnected to and from the electrical port (e.g., at a female coupling).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a system includes a jack screw including a body portion and a keyed portion extending along a length of the body portion. The system includes a panel including a first aperture configured to receive the jack screw. The system includes a connector including a second aperture configured to receive the jack screw. The system includes a plate including a third aperture configured to receive the jack screw, where the jack screw is configured to be aligned along an axis through the first aperture, the second aperture, and the third plate aperture, where a portion of the body portion of the jack screw extends past a locking plate.

In a second embodiment, a screw may include a body portion and a keyed portion extending at least partly along a length of the body portion, where the keyed portion is configured to be inserted into a first aperture that is part of a panel, a second aperture that is part of an electrical connector configured to be inserted via a third aperture of a locking plate, and wherein the body portion of jack screw extends past the second aperture when the keyed portion is completely inserted into the first aperture, the second aperture, and the third aperture.

In a third embodiment, a method includes aligning an electrical connector and a panel along an axis, where the axis extends through a first aperture of the electrical connector and a second aperture of the panel. The method includes inserting a jack screw through the first aperture and the second aperture along the axis, where the jack screw comprises a keyed portion configured to match a shape of the first aperture or the second aperture. The method includes coupling the panel and the electrical connector together using the jack screw, where the keyed portion is configured to prevent the jack screw from moving when inserted through the first aperture and the second aperture.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The present disclosure describes a jack screw for securing an electrical connector to an accessory and/or panel. In some instances, the electrical connector is secured to the panel, while a cable or other adapter is attached to the electrical connector. However, when the cable or adapter is removed from the electrical port, the jack screws used to secure the electrical connector to the accessory and/or panel may loosen as they are rotated when the cable or adapter is removed. These jack screws may be prone to dislodge when the cable or adapter is removed from the electrical port due to the rotation of the jack screws. This dislodging disrupts surrounding electrical circuits and may cause electrical disconnections or may completely remove mechanical support for the connector installed in the panel.

With this in mind, the present embodiments described herein include a jack screw that enables a cable or other adapter to be attached to the electrical connector, while allowing the jack screw to remain securely fastened to the electrical connector as cables or adapters are connected and removed from the electrical connector. To secure the jack screw to the electrical connector, the jack screw may include a keyed feature that may be attached via a body portion of the jack screw. The keyed portion may have any suitable shape (e.g., square, rectangular, triangular), such that the shape matches the shape of an elongated portion of the respective jack screw. The keyed portion of the jack screw may be inserted into an aperture of the electrical connector, the panel, or a locking plate for receiving the jack screw. The aperture may function as an anti-rotation element since it is shaped in such a manner to prevent rotation. As a result, when the jack screw is inserted into the aperture, the jack screw cannot be rotated. In this way, the cable or adapter or other accessory that is attached or detached from the jack screw can be removed or added, while the jack screw remains fixed in the aperture.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Figure 1:
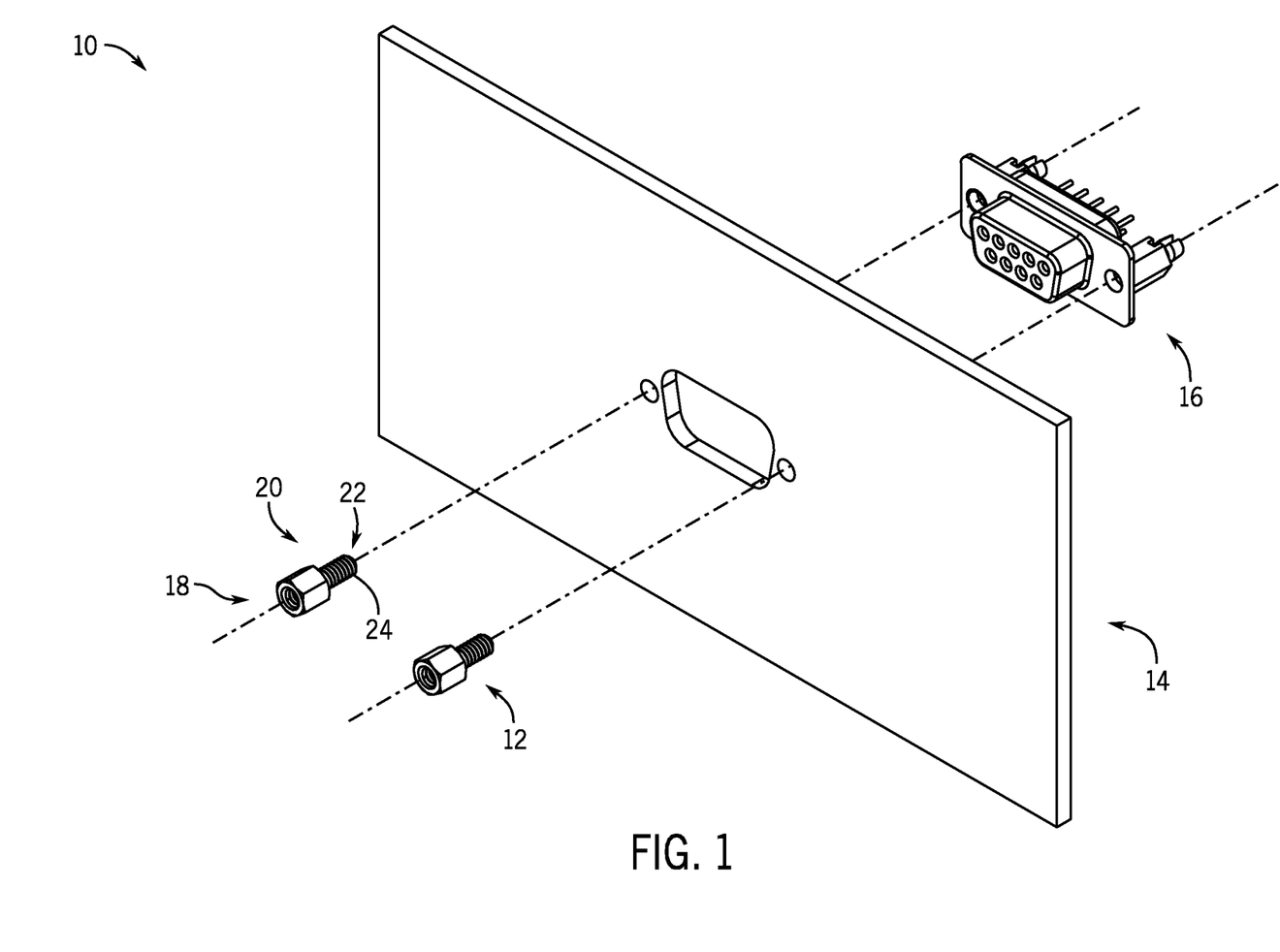
FIGS. 1 and 2 illustrate a panel assembly using a jack screw for securing the panel to an electrical port.
Figure 2:
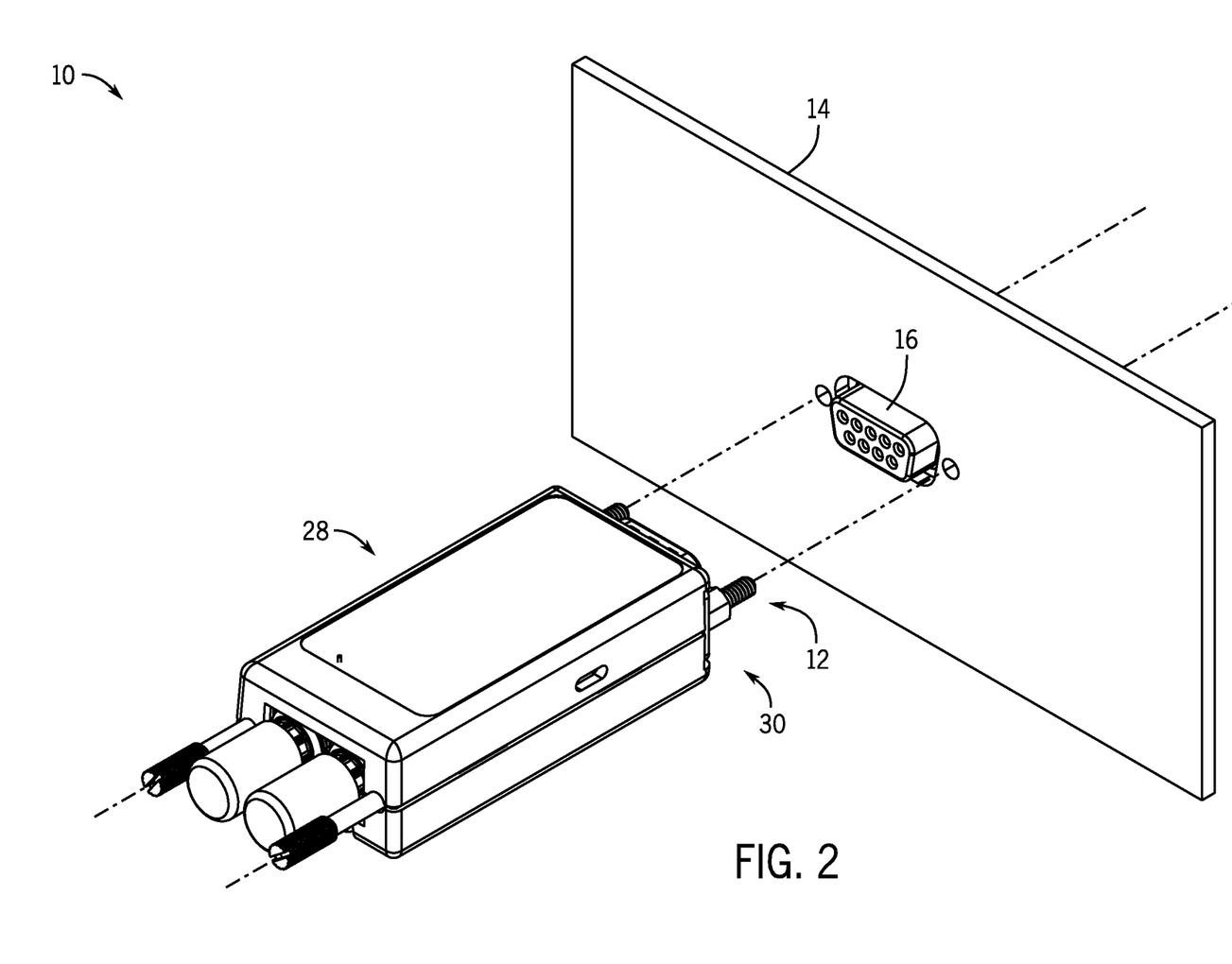

Turning now to the figures, FIGS. 1-2 illustrate one example of a jack screw 12 for securing a panel 14 to an electrical connector 16. The panel 14 may be used to cover electrical components of a meter or other device. The panel 14 may be used to protect electrical components from external environmental factors, such as moisture, humidity, dust, or debris, that could damage the electrical components or the panel may be used merely for mechanical support for the connector. The jack screws 12 include a head portion 18 having female threads inside the head portion 18, a body portion 20, and a tip portion 22 and may have a plurality of threads 24 disposed around the body portion 20. The jack screw 12 may be inserted into the electrical connector 16 to secure the electrical port 16 to the panel 14. An accessory 28 may be coupled to the electrical port 16, as shown in FIG. 2. The accessory 28 may be any suitable accessory, such as a port adapter, cable, or other accessory. Depending on an amount of torque that is applied to the jack screw 12 when coupled to the electrical connector 16, the jack screw 12 may remain attached to the accessory 28 (as illustrated by arrow 30) when a user tries to detach the accessory 28. That is, it may be difficult to remove the jack screws 12 when the jack screw 12 are attached to the accessory 28. If the jack screws 12 remain stuck in the accessory 28 as shown in FIG. 2, a user may need to obtain replacement jack screws 12 to be able to use the panel 14 and/or the electrical connector 16 again.

Figure 3:
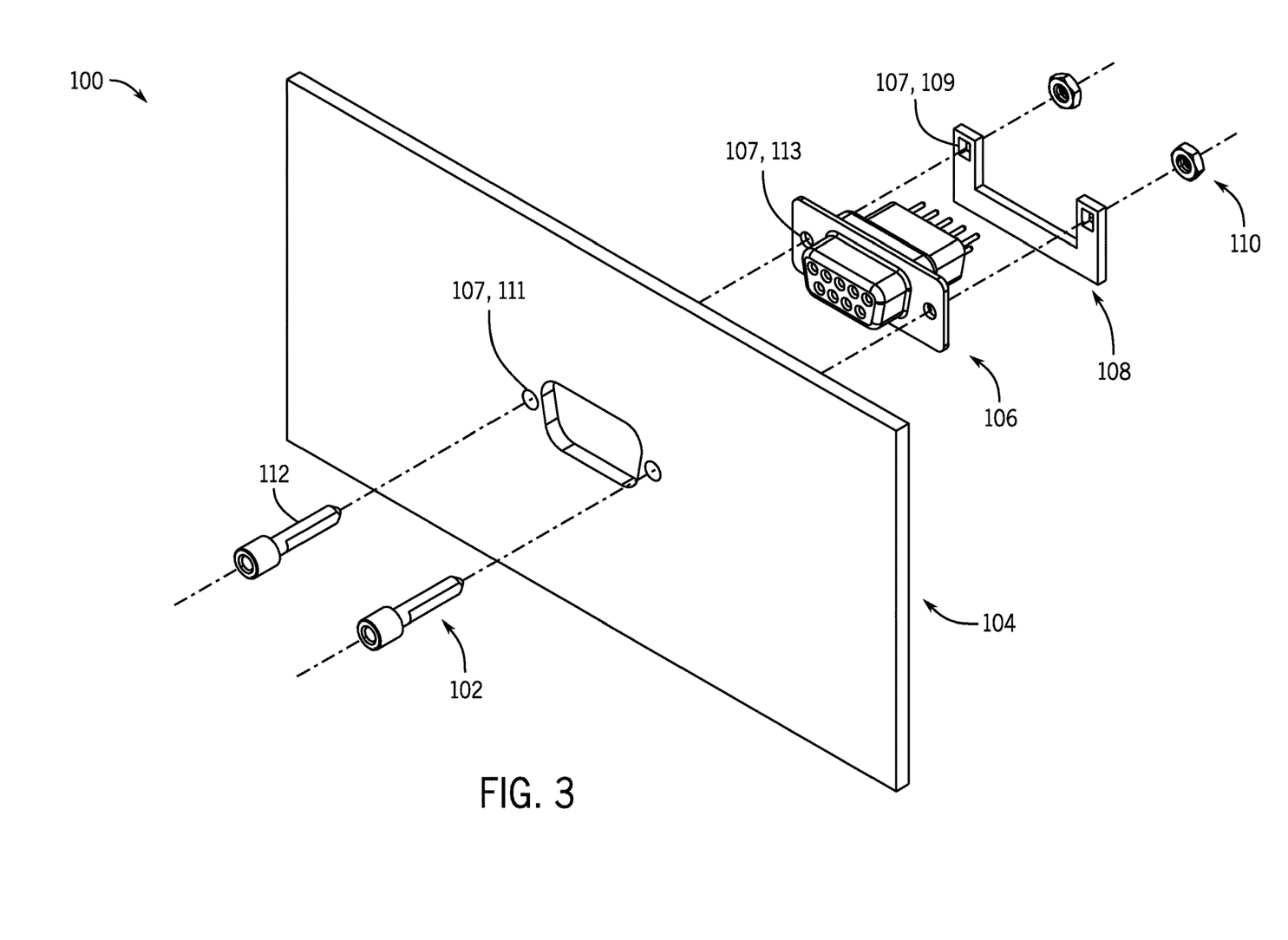
FIG. 3 is an exploded view of a jack screw, a panel, an electrical port, a locking plate, and a fastener, in accordance with an embodiment.

With this in mind, FIG. 3 is a perspective view of a jack screw system 100 depicted via an exploded view of a jack screw 102, a panel 104, an electrical connector 106, a locking plate 108, and a fastener 110, in accordance with an embodiment. The panel 104 may be secured to a meter or other device and used to protect electrical components of the meter or other device from external environmental factors, such as moisture, humidity, dust, or debris, that could damage the electrical components. In some embodiments, the electrical connector 106 may be secured to the panel 104 via a pair of jack screws 102. In one embodiment, the jack screws 102 may be described as a jack screw having a keyed portion 112. The jack screw 102 includes a body portion 114 between a head portion 116 and a tip portion 118 (see FIG. 4). The keyed portion 112 of the jack screw 102 may extend along an entire length of the body portion 114 or a portion of the body portion 114. In some embodiments, the keyed portion 112 may also extend along a portion of the tip portion 118.

In some embodiments, the tip portion 118 of the jack screw 102 includes a non-keyed portion. The non-keyed portion or the keyed portion 114 of the keyed jack screw may include threads (not shown). The threads allow for the fasteners 110 (e.g., nuts) to be attached to the jack screw 102 and hold the jack screw 102 in place. The jack screw could also be held in place using a retaining ring, snap, cotter pin, or any other device/means. The keyed portion 112 of the jack screw 102 includes a particular shape that corresponds to an aperture. The aperture may be a locking plate aperture 109, a panel aperture 111, a port aperture 113, and/or any other suitable aperture. In the illustrated embodiment, the jack screw 102 is inserted into the locking plate aperture 109. Thus, when the jack screw 102 is inserted through the locking plate 108 via the locking plate aperture 109, the modified jack screw 102 does not rotate, as explained in detail below.

Figure 4:
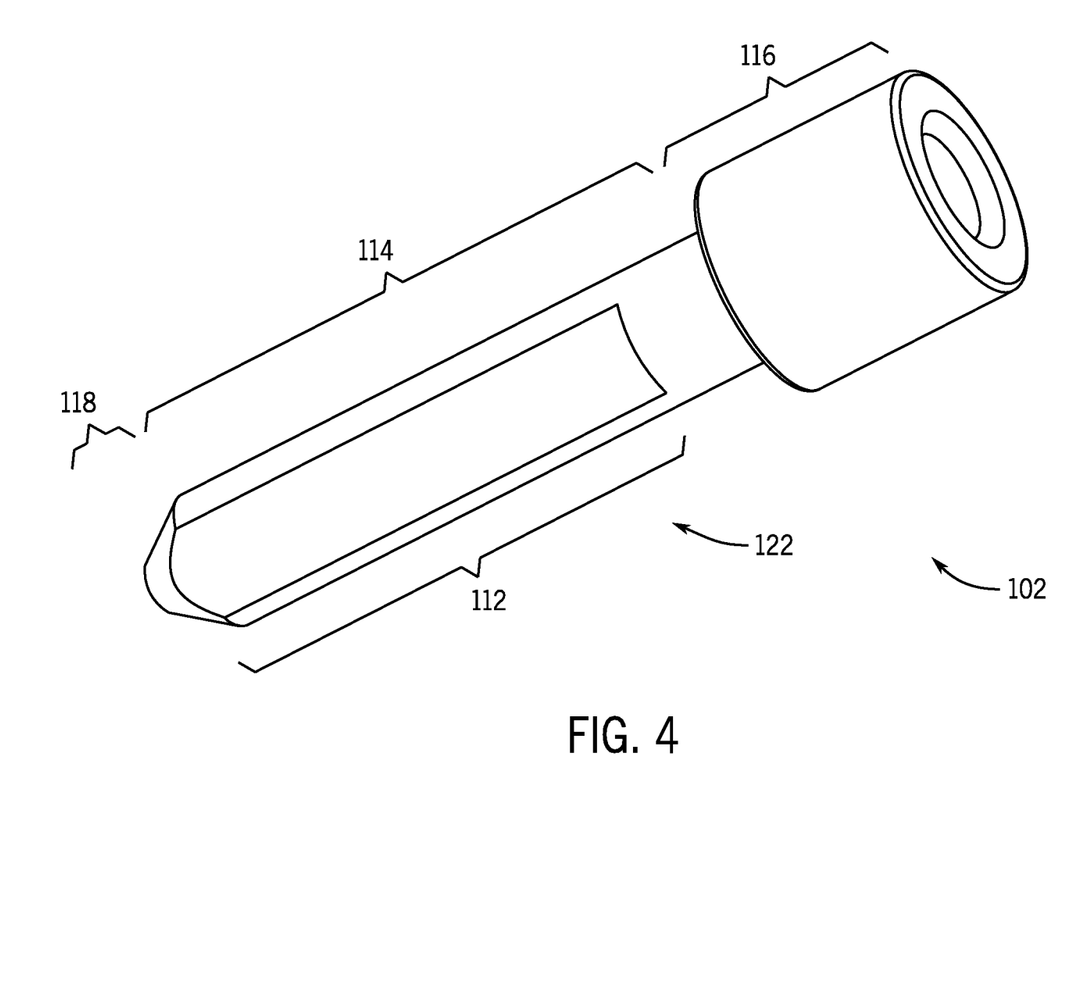
FIG. 4 is a perspective view of the jack screw of FIG. 3, in accordance with an embodiment.

FIG. 4 is a perspective view of the jack screw 102 of FIG. 3. The jack screw 102 includes the keyed portions 112 that extend along a length of the body portion 114 of the jack screw 102. In one embodiment, the keyed portions 112 may include flat faced portions that extend along the length of the body portion 114 of the jack screw 102. The body portion 114 is disposed between the head portion 116 and the tapered, tip portion 118 of the jack screw 102.

In the illustrated embodiment, the tip portion 118 is tapered to guide the keyed portions 112 into alignment with the corresponding contours of the locking plate apertures 109 to ease engaging of the keyed portions 112 with the locking plate apertures 109. In some embodiments, the locking plate apertures 109 may include sloped (e.g., chamfered) edges opening that also directs the tip portion into the locking plate apertures 109 to further ease the engagement of the jack screw 102. While the illustrated tip portion 118 is tapered, other embodiments may involve non-tapered tips.

The jack screw 102 varies from that of the jack screw 12 of FIG. 1 in that the jack screw 102 utilizes keyed sides 112 along the body portion 114 instead of a circular shape. In the jack screw 12, the strength of the screw depends in part on the width of the threads and the distance between the threads. As discussed above, the jack screw 12 may be prone to dislodgement when an accessory is secured to the jack screw with more than a threshold amount of torque. In contrast, the presently disclosed jack screw 102 includes keyed portions 112 that extend along a length of the body portion 114 of the jack screw 102. In the illustrated embodiment, the keyed portion 112 includes flat faced portions 122. The flat faced portions 122 of the jack screw 102 prevent rotation of the jack screw 102 when inserted into the apertures of the locking plate 109 (or other apertures 111, 113), such that the jack screw 102 cannot be dislodged regardless of an amount of torque applied to the jack screw 102. For example, if a user applies more than a threshold amount of torque in trying to remove an accessory from the electrical port 106, the jack screw 102 will remain intact in the locking plate and will not become dislodged.

Though the illustrated embodiment shows the jack screw 102 having flat faced portions 122, it may be appreciated that the jack screw 102 can be modified to have any suitable shape. The jack screw 102 can have various shapes along the body portion 114. The body portion 114 could be keyed to have a triangular, hexagonal, a star shape, have teeth, or any other suitable shape, as long as the body portion 114 matches the aperture 107 (e.g., the locking plate aperture 109, the panel aperture 111, the port aperture 113). For example, if the body portion 114 of the jack screw 102 is modified to have a triangular shape along the body portion 114, the locking plate aperture 109 would also be modified to be triangular in order to receive the triangular shape body portion of the jack screw 102 and prevent rotation of the jack screw 102 when inserted.

The flat faced portions 122 may be machined from suitable materials, such as carbon steel, brass, steel or nickel alloys. A suitable material as defined herein is defined as a material being strong enough to not yield at a threshold amount of torque. The material may be loaded into a machine between one or more dies and cut to a desired length. From the resulting length, a portion is allowed to protrude from the dies at one end and is then machined into the flat faced portion 122 by a suitable metalworking machining instrument. The tip portion 118 of the jack screw 102 may be non-keyed and may optionally include threads. The body portion 114 may also include threads. The presence of threads help enable the modified jack screw 102 to be fastened into place via fasteners 110 (e.g., nuts). The head portion 116 may include female threading to attach the jack screw within a body of the accessory to secure the accessory to the jack screw.

Figure 5:
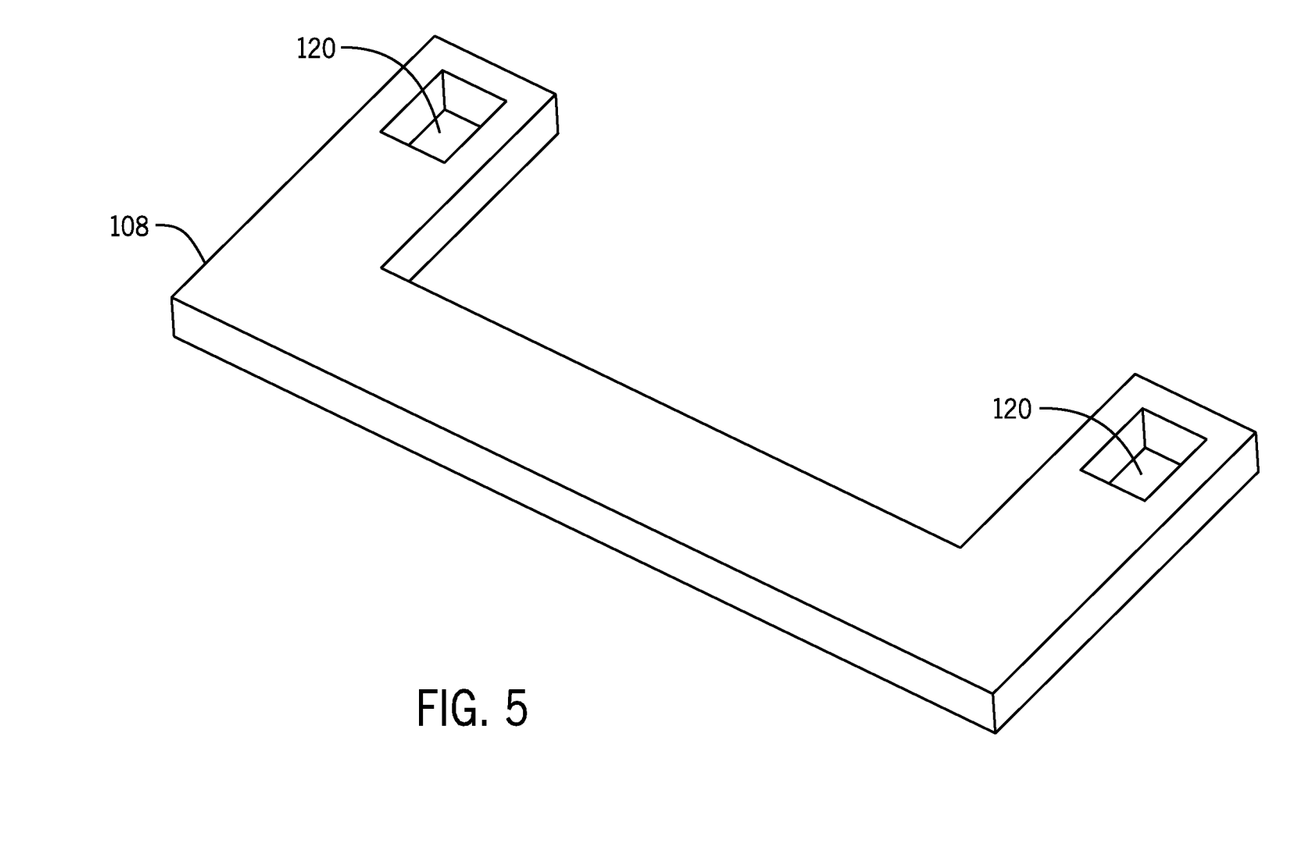
FIG. 5 is a perspective view of the locking plate of FIG. 3, in accordance with an embodiment.

FIG. 5 is a perspective view of the locking plate of FIG. 3. The locking plate 108 consist of multiple locking plate apertures 109. The locking plate apertures 109 serve an anti-rotation function for the jack screws 102 while disposed in the locking plate 108. As discussed, the locking plate apertures 109 match the shape of the keyed portion 112 of the jack screws 102 so the keyed portions 112 of the jack screws 102 fit securely into the locking plate apertures 109. The locking plate apertures need not match the keyed portion of the jack screws exactly, but they may be shaped in such a way that when the locking plate apertures 109 receive the jack screws 102, the jack screws are prevented from rotating within the locking plate apertures 109. Despite high torque applied to the jack screws 102, the jack screws 102 are prevented from rotating and becoming dislodged from the locking plate 108. Accordingly, when the accessory that is connected to the jack screw 102 is removed, manipulated, or adjusted, the jack screw 102 does not move within the locking plate aperture 109. Accordingly, the locking plate 108 enables the jack screw 102 to remain within the panel 104 and/or the electrical port 106, thereby preventing the jack screw 102 from becoming stuck to the accessory.

The locking plate 108 may be integrated within the panel 104, or the locking plate 108 may be a separate piece of the assembly 100, as shown in FIG. 3. The location of the locking plate 108 may be moved to any suitable location within the assembly 100. For example, the locking plate 108 may be disposed in front of the electrical port 106 or behind the electrical port 106. Moreover, in some embodiments, the apertures 107 to receive the jack screw could be disposed in the panel 104 or on the electrical port 106 as discussed above. In these scenarios, the locking plate 108 could be removed from the assembly 100 entirely, as long as the apertures 107 to receive the keyed portions 112 of the jack screws 102 are present and generally match the shape of the keyed portion 112 of the jack screw 102.

Figure 6:
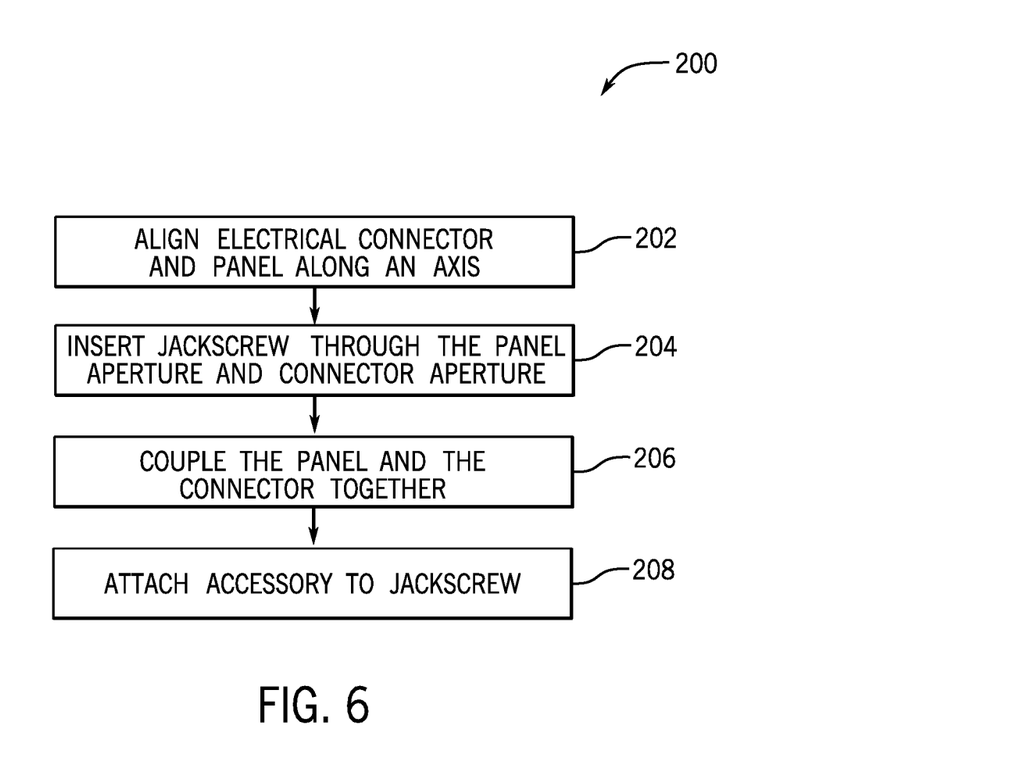
FIG. 6 is an example flowchart of a process for using the jack screw of FIG. 3, in accordance with an embodiment.

FIG. 6 is an example flowchart of a process 200 for using the jack screw 102 of FIGS. 3-5 to secure the electrical connector 106 to the panel 104, in accordance with an embodiment. The process 200 includes aligning (block 202) the panel 104 and the electrical connector 106 along an axis, where the axis extends through the panel aperture 111 of the panel 104 and the aperture 113 of the electrical connector 106. The process 200 includes inserting (block 204) the jack screw 102 through the panel aperture 111 of the panel 104 and the aperture 113 of the electrical connector 106 along the axis. In some embodiments, the aperture(s) 107 that receive the jack screw(s) 102 may be disposed in another part of the assembly (e.g., the locking plate 108). As described above, the jack screw 102 may include the keyed portion 112. The shape of the keyed portion 112 matches the panel aperture 111 and the electrical connector aperture 113. The panel 104 and the electrical connector 106 are coupled together (block 206). The process 200 includes attaching (block 208) an accessory to the electrical connector 106. After the modified jack screw 102 is inserted into the panel aperture 111 and the aperture 113, a nut may be secured to the jack screw 102 to secure the jack screw to the panel 104. The jack screw 102 does not move in spite of the torque applied to the jack screw 102. Thus, when an accessory is attached or removed to the jack screw 102, the jack screw 102 remains in place.

Technical effects of the present disclosure include systems and methods for securing an electrical connector to an accessory and/or panel. The modified jack screw enables a cable or other adapter to be attached to the electrical connector, while allowing the jack screw to maintain a secure coupling when the cable or adapter is removed from the electrical connector. The jack screw may include a keyed feature along a body portion of the jack screw, and the keyed portion may have any suitable shape (e.g., rectangular, triangular, etc.). The keyed portion of the modified jack screw may be inserted into an aperture for receiving the modified jack screw. The aperture may be disposed in the electrical connector, the panel, and/or a locking plate. The aperture functions as an anti-rotation element. As such, when the jack screw is inserted into the aperture, the jack screw cannot be rotated. Accordingly, the cable, adapter, or other accessory that is attached or detached from the modified jack screw can be separated from the assembly without rotating the jack screws themselves. Moreover, the life span of the jack screws, the panel, and the electrical connector may be extended due to the improved shape of the jack screw.

While specific embodiments and applications of the disclosure have been illustrated and described, it is to be understood that the disclosure is not limited to the precise configurations and components disclosed herein. For example, the systems and methods described herein may be applied to electrical or computer equipment or devices having one or more communication ports (e.g., a DB9 port, a USB-C port, and the like). Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system comprising:
a jack screw comprising a body portion and a keyed portion extending along a length of the body portion;
a panel comprising a first aperture configured to receive the jack screw;
a connector comprising a second aperture configured to receive the jack screw; and
a plate comprising a third aperture configured to receive the jack screw, wherein the jack screw is configured to be aligned along an axis through the first aperture, the second aperture, and the third aperture, wherein a portion of the body portion of the jack screw extends past the plate, and wherein the third aperture comprises a first shape corresponding to a second shape of the keyed portion.

2. The system of claim 1, wherein the jack screw comprises a tapered tip portion to guide the body portion into alignment with corresponding contours of the third aperture to ease engaging of the body portion.

3. The system of claim 1, wherein the keyed portion comprises a square shape, a triangular shape, a star shape, a cross shape, or a rectangular shape.

4. The system of claim 1, wherein the connector is configured to mate with an accessory.

5. The system of claim 4, wherein the accessory comprises an adapter cable or a power cable, and wherein a head portion of the jack screw is attached within a body of the accessory to secure the accessory on the jack screw.

6. The system of claim 1, wherein the plate is configured to prevent the jack screw from moving when the jack screw is inserted through the third aperture.

7. The system of claim 1, comprising a fastener, wherein the fastener is secured to the portion of the body portion of the jack screw on an opposite side of the plate relative to the panel.

8. A screw, comprising:
a body portion;
a keyed portion extending at least partly along a length of the body portion, wherein the keyed portion is configured to be inserted into a first aperture that is part of a panel, a second aperture that is part of an electrical connector configured to be inserted via a third aperture of a locking plate, and wherein a portion of the body portion of the screw extends past the second aperture when the keyed portion is completely inserted into the first aperture, the second aperture, and the third aperture, and wherein the keyed portion comprises a square shape, a triangular shape, a star shape, a cross shape, or a rectangular shape; and
a tapered tip portion configured to guide the body portion into alignment with corresponding contours of the third aperture to ease engaging of the body portion.

9. The screw of claim 8, comprising a head portion having female threads to engage male threads of an accessory to secure the screw within the accessory.

10. The screw of claim 8, wherein the keyed portion extends onto the tip portion.

11. The screw of claim 8, wherein the screw is configured to mate with an accessory.

12. The screw of claim 11, wherein the accessory comprises a cover, an adapter cable, or a power cable.

13. The screw of claim 8, wherein the panel is configured to reduce movement of the screw when the screw is inserted through the third aperture of the locking plate.

14. A method, comprising:
aligning an electrical connector and a panel along an axis, wherein the axis extends through a first aperture of the electrical connector and a second aperture of the panel;
inserting a jack screw through the first aperture and the second aperture along the axis, wherein the jack screw comprises;
a keyed portion configured to match a shape of the first aperture or the second aperture; and
a tapered tip portion guide the jack screw into alignment with corresponding contours of a third aperture to ease engaging of the jack screw; and
coupling the panel and the electrical connector together using the jack screw, wherein that the keyed portion is configured to prevent the jack screw from moving when inserted through the first aperture and the second aperture.

15. The method of claim 14, comprising:
coupling an accessory to the electrical connector, wherein the accessory comprises a cover, a power cable, or an adapter cable.

16. The method of claim 14, wherein the keyed portion extends along a body portion of the jack screw.

17. The method of claim 16, wherein the first aperture and the second aperture comprise the shape corresponding to the keyed portion.

* * * * *